United States Patent
Vo et al.

(10) Patent No.: US 9,890,322 B2
(45) Date of Patent: Feb. 13, 2018

(54) SURFACE MODIFICATION AGENT EMULSIONS COMPRISING HYDROPHOBICALLY MODIFIED AMINE-CONTAINING POLYMERS FOR USE IN SUBTERRANEAN FORMATIONS

(71) Applicant: Halliburton Energy Services, Inc., Houston, TX (US)

(72) Inventors: Loan K. Vo, Houston, TX (US); Philip D. Nguyen, Houston, TX (US); James William Ogle, Spring, TX (US); Feng Liang, Cypress, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/102,714

(22) PCT Filed: Mar. 13, 2014

(86) PCT No.: PCT/US2014/025411
§ 371 (c)(1),
(2) Date: Jun. 8, 2016

(87) PCT Pub. No.: WO2015/105521
PCT Pub. Date: Jul. 16, 2015

(65) Prior Publication Data
US 2016/0319183 A1 Nov. 3, 2016

Related U.S. Application Data

(63) Continuation-in-part of application No. PCT/US2014/010643, filed on Jan. 8, 2014.

(51) Int. Cl.
*C09K 8/528* (2006.01)
*C09K 8/575* (2006.01)
(Continued)

(52) U.S. Cl.
CPC .............. *C09K 8/528* (2013.01); *C09K 8/572* (2013.01); *C09K 8/5751* (2013.01);
(Continued)

(58) Field of Classification Search
CPC ......... C09K 8/528; C09K 8/572; E21B 37/06; E21B 43/26
(Continued)

(56) References Cited

U.S. PATENT DOCUMENTS 4,042,031 A  8/1977  Knapp
5,775,425 A  7/1998  Weaver et al.
(Continued)

FOREIGN PATENT DOCUMENTS

CA  2772833  3/2010
CA  2833833  11/2012
(Continued)

OTHER PUBLICATIONS

Office Action received in corresponding Canadian Application No. 2,890,033 dated Apr. 26, 2016.
(Continued)

*Primary Examiner* — Zakiya W Bates
*Assistant Examiner* — Ashish Varma
(74) *Attorney, Agent, or Firm* — McDermott Will & Emery LLP

(57) ABSTRACT

Methods including preparing a surface modification agent emulsion comprising an aqueous base fluid, a surfactant, and a hydrophobically-modified amine-containing polymer (HMAP), the HMAP comprising a plurality of hydrophobic modifications on an amine-containing polymer, and wherein the aqueous base fluid forms an external phase of the surface modification agent emulsion and the HMAP forms an inter-
(Continued)

nal phase of the surface modification agent emulsion; and introducing the surface modification agent emulsion into a subterranean formation.

17 Claims, 1 Drawing Sheet

(51) Int. Cl.
| | |
|---|---|
| *E21B 43/02* | (2006.01) |
| *C09K 8/57* | (2006.01) |
| *C09K 8/66* | (2006.01) |
| *C09K 8/68* | (2006.01) |
| *C09K 8/88* | (2006.01) |
| *E21B 37/06* | (2006.01) |
| *E21B 43/26* | (2006.01) |
| *E21B 43/267* | (2006.01) |

(52) U.S. Cl.
CPC .......... *C09K 8/5753* (2013.01); *C09K 8/5755* (2013.01); *C09K 8/665* (2013.01); *C09K 8/68* (2013.01); *C09K 8/88* (2013.01); *C09K 8/882* (2013.01); *C09K 8/885* (2013.01); *E21B 37/06* (2013.01); *E21B 43/025* (2013.01); *E21B 43/26* (2013.01); *E21B 43/267* (2013.01)

(58) Field of Classification Search
USPC ......................................................... 166/304
See application file for complete search history.

(56) References Cited

U.S. PATENT DOCUMENTS

| | | | |
|---|---|---|---|
| 5,898,811 A | 4/1999 | DiGiovanni et al. | |
| 6,047,772 A | 4/2000 | Weaver et al. | |
| 7,063,151 B2 | 6/2006 | Nguyen et al. | |
| 7,134,497 B1 | 11/2006 | Chatterji et al. | |
| 7,392,847 B2 | 7/2008 | Gatlin et al. | |
| 7,398,825 B2 | 7/2008 | Nguyen et al. | |
| 7,493,957 B2 | 2/2009 | Nguyen et al. | |
| 7,571,767 B2 | 8/2009 | Parker | |
| 7,581,593 B2 | 9/2009 | Pankratz et al. | |
| 7,730,950 B2 | 6/2010 | Nguyen et al. | |
| 7,766,099 B2 | 8/2010 | Nguyen | |
| 7,934,557 B2 | 5/2011 | Nguyen | |
| 7,956,017 B2 | 6/2011 | Gatlin et al. | |
| 8,105,986 B2 | 1/2012 | Zhang | |
| 2003/0234103 A1 | 12/2003 | Lee et al. | |
| 2006/0035790 A1 | 2/2006 | Okell et al. | |
| 2006/0124309 A1 | 6/2006 | Nguyen | |
| 2006/0289162 A1 | 12/2006 | Santra et al. | |
| 2009/0095535 A1* | 4/2009 | Nguyen | C09K 8/12 175/72 |
| 2010/0069536 A1 | 3/2010 | Sau | |
| 2012/0220504 A1* | 8/2012 | Rickman | C09K 8/68 507/220 |
| 2012/0279704 A1 | 11/2012 | Eoff et al. | |
| 2013/0274170 A1 | 10/2013 | Yuan-Huffman et al. | |
| 2014/0000891 A1 | 1/2014 | Mahoney et al. | |
| 2015/0267520 A1 | 9/2015 | Liang et al. | |

FOREIGN PATENT DOCUMENTS

| | | |
|---|---|---|
| WO | 0194742 A1 | 12/2001 |
| WO | 2014109939 A1 | 7/2014 |
| WO | 2014110110 A1 | 7/2014 |
| WO | 2015105521 A1 | 7/2015 |

OTHER PUBLICATIONS

International Search Report and Written Opinion for PCT/US2014/010022 dated Apr. 23, 2014.
International Search Report and Written Opinion for PCT/US2014/010643 dated Apr. 23, 2014.
Nguyen et al., "Water-Based, Frac-Pack Remedial Treatment Extends Well Life," SPE 144065, 2011.
International Search Report and Written Opinion for PCT/US2014/024511 dated Oct. 8, 2014.

* cited by examiner

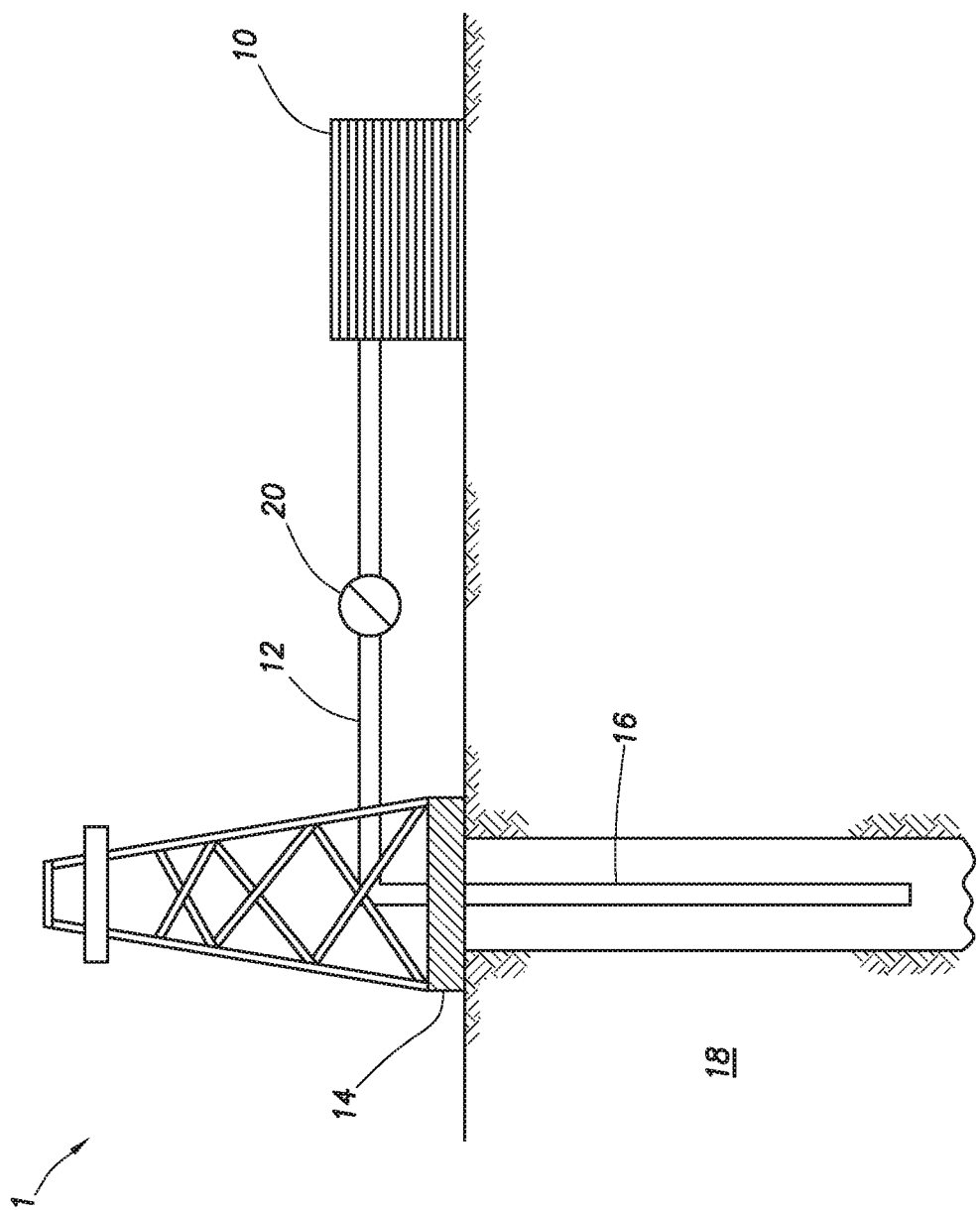

SURFACE MODIFICATION AGENT EMULSIONS COMPRISING HYDROPHOBICALLY MODIFIED AMINE-CONTAINING POLYMERS FOR USE IN SUBTERRANEAN FORMATIONS

CROSS-REFERENCE TO RELATED APPLICATIONS

This application is a 371 National Stage Application from PCT/US2014/025411, filed on Mar. 13, 2014 and published as WO/2015/105521 which is a continuation-in-part of PCT Application PCT/US2014/010643, filed on Jan. 8, 2014 and published as WO/2014/110110. This application is related to U.S. Provisional Application No. 61/750,077, filed Jan. 8, 2013, and U.S. Non-Provisional application Ser. No. 13/766,892, filed on Feb. 14, 2013.

BACKGROUND

The embodiments herein relate to surface modification emulsions comprising hydrophobically modified amine-containing polymers for use in subterranean formation operations.

Hydrocarbon wells are often at least partially located in unconsolidated portions of a subterranean formation. As used herein, the term "unconsolidated portion of a subterranean formation" refers to a portion of a subterranean formation that comprises loose particulate matter (e.g., particulates of sandstones, carbonates, limestones, coal beds, shales, diatomites, chalks; formation fines; and the like) that can migrate out of the formation with, among other things, the oil, gas, water, and/or other fluids recovered out of the well. The particulate material in a relatively unconsolidated portion of a subterranean formation may be readily entrained by recovered fluids, for example, those wherein the particulates in that portion of the subterranean formation are bonded together with insufficient bond strength to withstand the forces produced by the production of fluids through those regions of the formation. The presence of particulate matter, such as sand, in the recovered fluids may be undesirable in that the produced particulates may abrade pumping and other producing equipment, reduce the fluid production capabilities of certain portions of a subterranean formation, require costly cleaning operations to remove the particulate matter from the recovered fluids, and the like.

One method used to mitigate the migration of particulates in subterranean formations involves adhering the particulates together in an area of interest in the subterranean formation, which is usually accomplished by treating the particulates with traditional tackifiers. As used herein, the term "tackifier" generally refers to a chemical or polymer capable of forming a non-hardening coating on a surface of a particulate (e.g., formation fines, formation sand, proppant particulates, gravel particulates, and the like). Generally, traditional tackifiers are sticky to the touch, which may cause traditional tackifiers and coated particulates to accumulate on surfaces of wellbore tools (e.g., pumps, pipes, sand screws, and the like). Further, in deviated wellbores, the accumulation of tacky particulates can be especially problematic because particulate settling is magnified across the wellbore radius as compared to along the wellbore length. The accumulation of particulates within the wellbore can cause the pressure in the wellbore to increase, which can lead to costly formation damage. In some instances, remediation of accumulated traditional tackifiers and coated particulates can involve significant time and cost.

In addition to encountering unconsolidated particulates during subterranean formation operations, formations fluids may interact or otherwise contact the wellbore and downhole equipment (e.g., formation fluids may be produced to the surface, interact with various equipment and operations downhole, and the like). Formation fluids are generally complex mixtures of aliphatic hydrocarbons, aromatics, hetero-atomic molecules, anionic and cationic salts, acids, sands, silts, clays, and a vast array of other components. Because of the complex composition of formation fluids and exposure to sometimes severe conditions of heat, pressure, and turbulence during a subterranean formation operation, scale (i.e., mineral or solid salt deposits) often precipitate and buildup in the subterranean formation (e.g., in the formation matrix, in proppant packs, and the like) and on the production equipment (e.g., sand screens, production tubing, and the like).

Scale can lead to corrosion of the production equipment, which shortens the lifetime of the equipment. Further, scale buildup in the formation may cause decreased permeability, and scale buildup in the equipment may choke off the flow path, both of which the reduce amount of hydrocarbons that can be produced from the formation. In some instances, the scale can be cleaned up. However, such cleaning operations are often time-consuming and costly and, in some instances, may utilize harsh chemicals that are environmentally unfriendly.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 shows an illustrative schematic of a system for delivering fluids described herein to a downhole location, according to one or more embodiments.

DETAILED DESCRIPTION

The embodiments herein relate to surface modification agent emulsions comprising hydrophobically modified amine-containing polymers for use in subterranean formation operations. Specifically, the embodiments herein relate to surface modification agent emulsions having a continuous aqueous external phase and a discontinuous internal phase comprising one or more hydrophobically modified amine-containing polymers. As used herein, the term "hydrophobically modified amine-containing polymer" (or "HMAP") is used to describe amine-containing polymers (i.e., polymers having an amine in the polymer backbone, polymer branch, or in both the backbone and branches) that have been hydrophobically modified.

Generally, the HMAP, like traditional tackifiers, is non-hardening but is less sticky to the touch than traditional tackifiers while still being effective at agglomerating particulates. As a consequence, the treatment fluids comprising the HMAP or HMAP-coated particulates may advantageously stick to wellbore tools to a lesser degree than traditional tackifiers. Mitigating the accumulation of sticky substances and particulates on wellbore tools reduces the cost and use of chemicals associated with cleanup of traditional tackifiers.

In some embodiments, the HMAP described herein may be used to coat surfaces (e.g., formation surfaces and particle surfaces) and mitigate the buildup of scale and the associated reduced formation permeability. As such, the HMAP described herein may be useful in reducing the frequency with which costly, time-consuming remedial operations need to be performed to remove scale buildup. While one or more embodiments of the present disclosure may focus on use of the surface modification agent emulsion described herein during production operations (e.g., hydraulic fracturing, remedial treatments, fracture-acidizing treatments) in a hydrocarbon producing well, it will be appreciated that the surface modification agent emulsion may equally be used in injection wells, without departing from the scope of the present disclosure. For example, the surface modification agent emulsion may be used to coat the formation face of an injection well, for example, to stabilize loose particulates therein, as well as to mitigate scale formation.

Generally, HMAPs may be introduced into a subterranean formation to consolidate unconsolidated particulates and/or to mitigate scale buildup only under certain conditions due to their chemical makeup. Typically, an HMAP may be introduced into a formation alone in the presence of a solvent only. In order for HMAPs to be placed into a formation alone in the presence of an aqueous fluid, they typically must be coated onto a particulate, the particulate capable of preventing the HMAPs from leaching out of the fluid. However, many subterranean formation operations are performed using aqueous base fluids and not all operations require or benefit from the inclusion of a particulate. The surface modification agent emulsions described in the present disclosure permit the HMAPs to be placed into a subterranean formation directly or diluted or otherwise placed into a treatment fluid having an aqueous base without having to first be coated onto a solid particulate because the aqueous component of the emulsion surrounds the HMAPs and interacts with other aqueous fluids. Furthermore, the surface modification agent emulsions described herein remain capable of being coated onto a particulate. Moreover, because the surface modification agent emulsion is compatible with aqueous fluids, the surface modification agent emulsion may be used simultaneously during a fracture-acidizing operation, rather than having to first fracture-acidize and thereafter separately introduce the HMAP. As used herein, the term "fracture-acidizing," and all of its variants (e.g., "fracture-acidize"), refers to a subterranean formation stimulation operations in which an acid is injected into the formation at a rate and pressure sufficient to create or enhance at least one fracture therein. The flowing acid may then etch the fracture faces, forming conducting channels that remain open regardless of whether the fracture is propped after hydraulic pressure is removed. Thus, the surface modification agent emulsions may provide a more universally useful form of introducing HMAPs into a subterranean formation.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having the benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As described above, the HMAPs described herein are amine-containing polymers that have been hydrophobically modified. Examples of amine-containing polymers may include, but are not limited to, polyamines (e.g., spermidine and spermine), polyimines (e.g., poly(ethylene imine) and poly(propylene imine)), polyamides, poly(2-(N,N-dimethylamino)ethyl methacrylate), poly(2-(N,N-diethylamino)ethyl methacrylate), poly(vinyl imidazole), and the like, any copolymer thereof, and any combination thereof. Further, amine-containing polymers may include a copolymer of at least one of the foregoing amine-containing polymers (or corresponding monomer unit) and at least one polymer (or corresponding monomer unit) that does not contain an amine (e.g., polyethylene, polypropylene, polyethylene oxide, polypropylene oxide, polyvinylpyridine, polyacrylic acid, polyacrylate, polymethacrylate, and the like).

Hydrophobic modifications may, in some embodiments, include, but are not limited to, a $C_4$-$C_{30}$ characterized by at least one selected from the group consisting of a straight chain, a branched chain, comprising an unsaturated C—C bond, comprising an aryl group, and the like, and any combination thereof.

Formulas I-III provide examples of the HMAP described herein wherein Z is R or COR, and wherein R is a hydrophobic modification described herein (e.g., a $C_4$-$C_{30}$ characterized by at least one selected from the group consisting of a straight chain, a branched chain, comprising an unsaturated C—C bond, comprising an aryl group, and the like, and any combination thereof).

Formula I

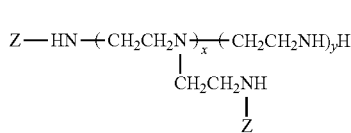

-continued

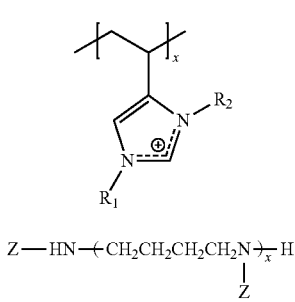

Formula II

Formula III

Z—HN—(CH$_2$CH$_2$CH$_2$CH$_2$N)$_x$—H
                                |
                                Z

In some embodiments, the HMAP may have a degree of modification such that the amount of hydrophobic modification ranges from a lower limit of about 0.1%, 1%, 10%, or 30% by molar ratio of amine content to an upper limit of about 99.9%, 95%, 70%, or 50% by molar ratio of amine content, and wherein the amount of hydrophobic modification may range from any lower limit to any upper limit and encompass any subset therebetween.

In some embodiments, the HMAP may have a molecular weight ranging from a lower limit of about 300 g/mol, 1,000 g/mo, 10,000 g/mol, or 100,000 g/mol to an upper limit of about 3,000,000 g/mol, 1,000,000 g/mol, or 100,000 g/mol, and wherein the molecular weight may range from any lower limit to any upper limit and encompass any subset therebetween.

In some embodiments, hydrophobic modifications may be achieved via a plurality of reaction schemes including, but not limited to, amidation with carboxy terminal compounds (e.g., fatty acids), quaternization by alkyl halides, addition reactions with alpha-olefins, nucleophilic attack with alkyl compounds having active groups (e.g., a terminal epoxide), and the like, and any combination thereof.

The surface modification agent emulsions of the embodiments herein may comprise an aqueous base fluid, an emulsion surfactant, and a HMAP. The emulsion surfactant may be used to form an interfacial film between the aqueous base fluid and the hydrophobic HMAP, thereby permitting the HMAP to form internal phase droplets within the continuous aqueous phase of the formed emulsion. Therefore, the combination of the aqueous base fluid, the emulsion surfactant, and the HMAP may simultaneously result in an aqueous-external emulsion for use in delivering the HMAPs to a downhole location, either as the surface modification agent emulsion itself, diluted in an aqueous treatment fluid, or coated onto a particulate. As used herein, the term "coated" or "coating," and all of its variants, does not imply any particular degree of coating on a particulate. In particular, the terms "coat" or "coating" do not imply 100% coverage by the coating on a particulate. It should be understood that the terms "particulate" or "particle" as used in this disclosure, include all known shapes of materials, including substantially spherical materials, fibrous materials, polygonal materials (such as cubic materials), and combinations thereof.

In general, the HMAP may be present in the surface modification agent emulsions described herein in an amount in the range of from a lower limit of about 10%, 11%, 12%, 13%, 14%, 15%, 16%, 17%, 18%, 19%, 20%, 21%, 22%, 23%, 24%, 25%, 26%, 27%, 28%, 29%, and 30% to an upper limit of about 50%, 49%, 48%, 47%, 46%, 45%, 44%, 43%, 42%, 41%, 40%, 39%, 38%, 37%, 36%, 35%, 34%, 33%, 32%, 31%, and 30% by weight of the surface modification agent emulsion.

Suitable aqueous base fluids for use in forming the surface modification agent emulsions of the present disclosure, as well as those for forming any aqueous based treatment fluid into which the surface modification agent emulsion may be diluted or otherwise included, may include, but may not be limited to, aqueous fluids, aqueous-miscible fluids, and any combination thereof.

Aqueous fluids suitable for use in conjunction with the embodiments described herein may comprise fresh water, saltwater (e.g., water containing one or more salts dissolved therein), brine (e.g., saturated salt water or produced water), seawater, produced water (e.g., water produced from a subterranean formation), aqueous-miscible fluids, and any combination thereof. Generally, the water may be from any source, provided that it does not contain components that might adversely affect the stability and/or performance of the first treatment fluids or second treatment fluids.

Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous fluid, and any combination thereof.

In certain embodiments, the density of the base fluid can be adjusted, among other purposes, to provide additional particulate transport and suspension in the treatment fluids used in the methods described herein. In certain embodiments, the pH of the base fluid may be adjusted (e.g., by a buffer or other pH adjusting agent), among other purposes, to activate a crosslinking agent and/or to reduce the viscosity of the first treatment fluid (e.g., activate a breaker, deactivate a crosslinking agent). In these embodiments, the pH may be adjusted to a specific level, which may depend on, among other factors, the types of gelling agents, acids, and other additives included in the treatment fluid. One of ordinary skill in the art, with the benefit of this disclosure, will recognize when such density and/or pH adjustments are appropriate.

In some embodiments, the base fluid may be foamed. In some embodiments a treatment fluid for use in conjunction with the embodiments described herein may comprise a base fluid, a gas, a foaming agent, and at least one of particulates, particulates in combination with HMAP, HMAP-coated particulates, or HMAP-coated particulates in combination with HMAP.

In some embodiments, the gas is selected from the group consisting of nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen.

In some embodiments, the quality of the foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 95%, or about 90% to about 95%.

Suitable foaming agents for use in conjunction with the embodiments described herein may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed treatment fluids at concentrations ranging typically from about 0.05% to about 2% of the liquid component by weight (e.g., from about 0.5 to about 20 gallons per 1000 gallons of liquid).

Suitable emulsion surfactants for use in the present disclosure may include any that are capable of emulsifying a hydrophobic component (e.g., the HMAPs described herein) in an aqueous-based component, so that the emulsion has an aqueous-external phase and a hydrophobic-internal phase. A preferred emulsion surfactant may be an amine surfactant. Such amine surfactants may include, but are not limited to, amine ethoxylates and amine ethoxylated quaternary salts such as tallow diamine and tallow triamine ethoxylates and quaternary salts. Examples of suitable emulsion surfactants may include, but are not limited to, ethoxylated $C_{12}$-$C_{22}$ diamine, ethoxylated $C_{12}$-$C_{22}$ triamine, ethoxylated $C_{12}$-$C_{22}$ tetraamine, ethoxylated $C_{12}$-$C_{22}$ diamine methylchloride quat, ethoxylated $C_{12}$-$C_{22}$ triamine methylchloride quat, ethoxylated $C_{12}$-$C_{22}$ tetraamine methylchloride quat, ethoxylated $C_{12}$-$C_{22}$ diamine reacted with sodium chloroacetate, ethoxylated $C_{12}$-$C_{22}$ triamine reacted with sodium chloroacetate, ethoxylated $C_{12}$-$C_{22}$ tetraamine reacted with sodium chloroacetate, ethoxylated $C_{12}$-$C_{22}$ diamine acetate salt, ethoxylated $C_{12}$-$C_{22}$ diamine hydrochloric acid salt, ethoxylated $C_{12}$-$C_{22}$ diamine glycolic acid salt, ethoxylated $C_{12}$-$C_{22}$ diamine dodecylbenzenesulfonate ("DDBA") salt, ethoxylated $C_{12}$-$C_{22}$ triamine acetate salt, ethoxylated $C_{12}$-$C_{22}$ triamine hydrochloric acid salt, ethoxylated $C_{12}$-$C_{22}$ triamine glycolic acid salt, ethoxylated $C_{12}$-$C_{22}$ triamine DDBSA salt, ethoxylated $C_{12}$-$C_{22}$ tetraamine acetate salt, ethoxylated $C_{12}$-$C_{22}$ tetraamine hydrochloric acid salt, ethoxylated $C_{12}$-$C_{22}$ tetraamine glycolic acid salt, ethoxylated $C_{12}$-$C_{22}$ tetraamine DDBSA salt, pentamethylated $C_{12}$-$C_{22}$ diamine quat, heptamethylated $C_{12}$-$C_{22}$ diamine quat, nonamethylated $C_{12}$-$C_{22}$ diamine quat, and combinations thereof.

In some embodiments of the present disclosure the amine surfactant may have the formula represented by Formula 1:

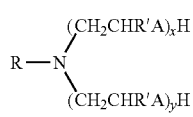

Formula 1 wherein R is a $C_{12}$-$C_{22}$ aliphatic hydrocarbon; R' is independently selected from hydrogen or $C_1$ to $C_3$ alkyl group; A is NH or O, and x+y has a value greater than or equal to one but also less than or equal to three. Preferably the R group is a non-cyclic aliphatic. In some embodiments, the R group contains at least one degree of unsaturation that is to say at least one carbon-carbon double bond. In other embodiments, the R group may be a commercially recognized mixture of aliphatic hydrocarbons such as soya, which is a mixture of $C_{14}$ to $C_{20}$ hydrocarbons, or tallow which is a mixture of $C_{16}$ to $C_{20}$ aliphatic hydrocarbons, or tall oil which is a mixture of $C_{14}$ to $C_{18}$ aliphatic hydrocarbons. In other embodiments, one in which the A group is NH, the value of x+y is preferably two with x having a preferred value of one. In other embodiments in which the A group is O, the preferred value of x+y is two with the value of x being preferably one. One example of a commercially available amine surfactant is TER 2168 SERIES available from Champion Chemicals located in Fresno, Tex. Other commercially available examples include ETHOMEEN® T/12 a diethoxylated tallow amine; ETHOMEEN® S/12 a diethoxylated soya amine; DUOMEEN® 0 a N-oleyl-1,3-diaminopropane, DUOMEEN® T a N-tallow-1,3-diaminopropane, all of which are available from Akzo Nobel.

In other embodiments, the emulsion surfactant may be a tertiary alkyl amine ethoxylate (a cationic surfactant). TRITON™ RW-100 surfactant (X and Y=10 moles of ethylene oxide) and TRITON™ RW-150 surfactant (X and Y=15 moles of ethylene oxide) are examples of tertiary alkyl amine ethoxylates that may be purchased from Dow Chemical Company.

In other embodiments, the emulsion surfactant is a combination of an amphoteric surfactant and an anionic surfactant. The relative amounts of the amphoteric surfactant and the anionic surfactant in the surfactant mixture are from about 30 to about 45% by weight of the surfactant mixture and from about 55 to about 70% by weight of the surfactant mixture, respectively. The amphoteric surfactant may be lauryl amine oxide, a mixture of lauryl amine oxide and myristyl amine oxide (i.e., a lauryl/myristyl amine oxide), cocoamine oxide, lauryl betaine, oleyl betaine, or combinations thereof, with the lauryl/myristyl amine oxide being preferred. The cationic surfactant may be cocoalkyltriethyl ammonium chloride, hexadecyltrimethyl ammonium chloride, or combinations thereof, with a 50/50 mixture by weight of the cocoalkyltriethyl ammonium chloride and the hexadecyltrimethyl ammonium chloride being preferred.

In yet other embodiments, the emulsion surfactant may be a nonionic surfactant. Such preferred nonionic surfactants may include, but are not limited to, alcohol oxylalkylates, alkyl phenol oxylalkylates, nonionic esters such as sorbitan esters and alkoxylates of sorbitan esters. Examples of suitable surfactants may include, but are not limited to, castor oil alkoxylates, fatty acid alkoxylates, lauryl alcohol alkoxylates, nonylphenol alkoxylates, octylphenol alkoxylates, tridecyl alcohol alkoxylates, such as POE-10 nonylphenol ethoxylate, POE-100 nonylphenol ethoxylate, POE-12 nonylphenol ethoxylate, POE-12 octylphenol ethoxylate, POE-12 tridecyl alcohol ethoxylate, POE-14 nonylphenol ethoxylate, POE-15 nonylphenol ethoxylate, POE-18 tridecyl alcohol ethoxylate, POE-20 nonylphenol ethoxylate, POE-20 oleyl alcohol ethoxylate, POE-20 stearic acid ethoxylate, POE-3 tridecyl alcohol ethoxylate, POE-30 nonylphenol ethoxylate, POE-30 octylphenol ethoxylate, POE-34 nonylphenol ethoxylate, POE-4 nonylphenol ethoxylate, POE-40 castor oil ethoxylate, POE-40 nonylphenol ethoxylate, POE-40 octylphenol ethoxylate, POE-50 nonylphenol ethoxylate, POE-50 tridecyl alcohol ethoxylate, POE-6 nonylphenol ethoxylate, POE-6 tridecyl alcohol ethoxylate, POE-8 nonylphenol ethoxylate, POE-9 octylphenol ethoxylate, mannide monooleate, sorbitan isostearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, POE-20 sorbitan monoisostearate ethoxylate, POE-20 sorbitan monolaurate ethoxylate, POE-20 sorbitan monooleate ethoxylate, POE-20 sorbitan monopalmitate ethoxylate, POE-20 sorbitan monostearate ethoxylate, POE-20 sorbitan trioleate ethoxylate, POE-20 sorbitan tristearate ethoxylate, POE-30 sorbitan tetraoleate ethoxylate, POE-40 sorbitan tetraoleate ethoxylate, POE-6 sorbitan hexastearate ethoxylate, POE-6 sorbitan monostearate ethoxylate, POE-6 sorbitan tetraoleate ethoxylate, and/or POE-60 sorbitan tetrastearate ethoxylate. Preferred nonionic surfactants include alcohol oxyalkylates such as POE-23 lauryl alcohol and alkyl phenol ethoxylates such as POE (20) nonyl phenyl ether. Other applicable nonionic surfactants are esters such as sorbitan monooleate.

While cationic, amphoteric, and nonionic surfactants are preferred, any suitable emulsifying surfactant can be used. Good surfactants for emulsification typically need to be either ionic to give charge stabilization or have long groups for steric stability in water. This would include other cationic surfactants and even anionic surfactants. Examples may include, but are not limited to, hexahydro-1,3,5-tris(2-hydroxyethyl)triazine, alkyl ether phosphate, ammonium lauryl sulfate, ammonium nonylphenol ethoxylate sulfate, branched isopropyl amine dodecylbenzene sulfonate, branched sodium dodecylbenzene sulfonate, dodecylbenzene sulfonic acid, branched dodecylbenzene sulfonic acid, fatty acid sulfonate potassium salt, phosphate esters, POE-1 ammonium lauryl ether sulfate, OE-1 sodium lauryl ether sulfate, POE-10 nonylphenol ethoxylate phosphate ester, POE-12 ammonium lauryl ether sulfate, POE-12 linear phosphate ester, POE-12 sodium lauryl ether sulfate, POE-12 tridecyl alcohol phosphate ester, POE-2 ammonium lauryl ether sulfate, POE-2 sodium lauryl ether sulfate, POE-3 ammonium lauryl ether sulfate, POE-3 disodium alkyl ether sulfosuccinate, POE-3 linear phosphate ester, POE-3 sodium lauryl ether sulfate, POE-3 sodium octylphenol ethoxylate sulfate, POE-3 sodium tridecyl ether sulfate, POE-3 tridecyl alcohol phosphate ester, POE-30 ammonium lauryl ether sulfate, POE-30 sodium lauryl ether sulfate, POE-4 ammonium lauryl ether sulfate, POE-4 ammonium nonylphenol ethoxylate sulfate, POE-4 nonyl phenol ether sulfate, POE-4 nonylphenol ethoxylate phosphate ester, POE-4 sodium lauryl ether sulfate, POE-4 sodium nonylphenol ethoxylate sulfate, POE-4 sodium tridecyl ether sulfate, POE-50 sodium lauryl ether sulfate, POE-6 disodium alkyl ether sulfosuccinate, POE-6 nonylphenol ethoxylate phosphate ester, POE-6 tridecyl alcohol phosphate ester, POE-7 linear phosphate ester, POE-8 nonylphenol ethoxylate phosphate ester, potassium dodecylbenzene sulfonate, sodium 2-ethyl hexyl sulfate, sodium alkyl ether sulfate, sodium alkyl sulfate, sodium alpha olefin sulfonate, sodium decyl sulfate, sodium dodecylbenzene sulfonate, sodium lauryl sulfate, sodium lauryl sulfoacetate, sodium nonylphenol ethoxylate sulfate, and/or sodium octyl sulfate.

The emulsion surfactant is preferably present in the surface modification agent emulsion described herein in an amount in the range from a lower limit of about 0.1%, 0.5%, 1%, 1.5%, 2%, 2.5%, 3%, 3.5%, 4%, 4.5%, 5%, and 5.5% to an upper limit of about 10%, 9.5%, 9%, 8.5%, 8%, 7.5%, 7%, 6.5%, 6%, and 5.5% by weight of the composition.

In some embodiments, the present disclosure may provide for preparing a surface modification agent emulsion comprising an aqueous base fluid, a surfactant, and an HMAP, where the HMAP comprises a plurality of hydrophobic modifications on an amine-containing polymer. The aqueous base fluid forms the external phase of the surface modification agent emulsion and the HMAP forms the internal phase of the surface modification agent emulsion. Thereafter, the surface modification agent emulsion may be introduced within a subterranean formation. In some embodiments, more than one HMAP may be used to form the surface modification agent emulsion.

The surface modification agent emulsion may be introduced into the subterranean formation at or below the formation matrix pressure. In other embodiments, the surface modification agent emulsion may be introduced into the subterranean formation above the formation matrix pressure, at a rate and pressure sufficient to create or enhance at least one fracture therein.

Depending on the particular application, the surface modification agent emulsion may be diluted in a treatment fluid. Such dilution may be used to, for example, reduce the amount of surface modification agent emulsion introduced into the subterranean formation for a specific operation, aid in pumping the surface modification agent emulsion to a downhole location, and the like. In some embodiments, the surface modification agent emulsion may be diluted in a treatment fluid comprising an aqueous base fluid, as described herein. In other embodiments, the surface modification agent emulsion may be diluted in a treatment fluid comprising an aqueous acid solution for forming a fracture-acidizing operation. The acid may be any acid suitable for use in a fracture-acidizing operation such as, for example, hydrochloric acid, hydrofluoric acid, acetic acid, formic acid, glycolic acid, and any combination thereof. In such embodiments, the treatment fluid comprising the surface modification agent emulsion and the aqueous acid solution may be introduced simultaneously into a subterranean formation at a rate and pressure sufficient to create or enhance at least one fracture therein, so as to etch channels in the fracture face with the aqueous acid solution and simultaneously allow the surface modification agent emulsion to coat the face of the fracture or at least a portion of the formation, thereby stabilizing loose particulates and/or mitigating scale buildup.

In some embodiments, treatment fluids described herein may further comprise additives. Suitable additives may include, but are not limited to, salts, weighting agents, inert solids, fluid loss control agents, emulsifiers, dispersion aids, corrosion inhibitors, emulsion thinners, emulsion thickeners, viscosifying agents, gelling agents, surfactants, particulates, proppants, gravel particulates, lost circulation materials, pH control additives, breakers, biocides, crosslinkers, stabilizers, chelating agents, gas hydrate inhibitors, mutual solvents, oxidizers, reducers, friction reducers, clay stabilizing agents, or any combination thereof. One skilled in the art with the benefit of this disclosure should understand the appropriate additives and concentrations thereof for use in conjunction with the embodiments described herein to achieve the desired result and so as to maintain operability of the methods described herein.

In some embodiments, the surface modification agent emulsion is able to coat the face of the formation, including faces forming portions of fractures, to stabilize loose particulates that may be present in the subterranean formation, thereby preventing or reducing their tendency to dislodge and be produced with production fluids or otherwise interfere with subterranean formation operations. In some embodiments, the surface modification agent emulsion may be introduced into a subterranean formation at a rate and pressure sufficient to create or enhance at least one fracture therein and in the process coat the face of the newly formed or enhanced fracture so as to stabilize any loose particulates and/or mitigate scale formation.

In some embodiments, the present disclosure may provide for coating the surface modification agent onto a particulate (e.g., formation fines, formation sand, proppants, gravel particulates, and the like), thereby forming emulsion coated particulates. These emulsion coated particulates may then be introduced into a subterranean formation to stabilize other particulates (e.g., formation fines) and/or for mitigating scale buildup. For example, in some embodiments, the emulsion coated particulates may be introduced into a fracture in a subterranean formation so as to form a proppant pack. As used herein, the term "proppant pack" refers to a collection of particulates within a fracture. The proppant pack may serve to prop open the fracture upon removal of hydraulic pressure. Forming a proppant pack with the emulsion coated particulates may enhance production of the fracture and the subterranean formation by stabilizing fines or other loose particles in the formation and/or mitigating scale buildup.

Suitable proppants for use in conjunction with the embodiments described herein may be any material suitable for use in subterranean operations. Examples of these particulates may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the embodiments described herein. In particular embodiments, preferred mean particulates size distribution ranges are one or more of 6/12, 8/16, 12/20, 16/30, 20/40, 30/50, 40/60, 40/70, or 50/70 mesh. Moreover, fibrous materials, that may or may not be used to bear the pressure of a closed fracture, may be included in certain embodiments described herein.

In some embodiments, in which the surface modification agent emulsion is coated onto a particulate (e.g., a proppant). The particulates may be coated with the surface modification agent emulsion by any means known to those of skill in the art including, but not limited to, dry-coating and wet-coating methods. In some embodiments, the emulsion coated particulates may be placed into a subterranean formation in a treatment fluid comprising an aqueous base fluid. In some embodiments, the particulates may be pre-coated with the surface modification agent emulsion prior to introducing the particulates into a subterranean formation or prior to introducing them into a treatment fluid. In other embodiments, the particulates may be coated with the surface modification agent emulsion on-the-fly at the worksite. As used herein, the term "on-the-fly" refers to performing an operation during a subterranean treatment that does not require stopping normal operations. For example, the particulates may be coated by including the particulates into a treatment fluid comprising an aqueous base fluid and the surface modification agent emulsion described herein and allowing the surface modification agent emulsion to coat the particulates by their association; such may be done while pumping the treatment fluid into the subterranean formation.

In those embodiments in which the surface modification agent emulsion is coated onto a particulate, an optional silane coupling agent may be included in the surface modification agent emulsion to, among other things, act as a mediator to help bond the surface modification agent emulsion to the particulates. The silane coupling agent may be included in either or both of the internal phase or the external phase of the surface modification agent emulsion. Examples of suitable silane coupling agents may include, but are not limited to, N-2-(aminoethyl)-3-aminopropyltrimethoxysilane, 3-glycidoxypropyltrimethoxysilane, and combinations thereof. In some embodiments, the silane coupling agent may be present in the surface modification agent emulsion at a concentration ranging from a lower limit of about 0.001%, 0.05%, 0.1%, and 0.5% by weight of the entire emulsion to an upper limit of about 3%, 2.5%, 2%, 1.5%, 1%, and 0.5% by weight of the entire emulsion, wherein the concentration of the silane coupling agent may range from any lower limit to any upper limit and encompass any range therebetween.

Some embodiments may involve using the surface modification agent emulsion herein and/or the surface modification agent emulsion coated particulates in fracturing operations, which may involve (1) optionally introducing a prepad fluid into the subterranean formation, (2) introducing a pad fluid into the subterranean formation to initiate and create at least one fracture, and (3) introducing a proppant slurry into the subterranean formation so as to place the proppant into the fracture, thereby forming a proppant pack. Prepad fluids are generally introduced at or below matrix pressure and before pad fluids. Pad fluids are generally introduced above matrix pressure (i.e., at a pressure sufficient to create or extend at least one fracture in the subterranean formation). In some embodiments, at least one of the prepad fluid, pad fluid, and flush fluid may comprise the surface modification agent emulsion described herein. In some embodiments, proppant slurries may comprise at least one of proppant, proppant in combination with the surface modification agent emulsion, surface modification agent emulsion coated proppant, or surface modification agent emulsion coated proppant in combination with the surface modification agent emulsion.

In various embodiments, systems may be configured for delivering the surface modification agent emulsions in any form described herein (e.g., alone, diluted in a treatment fluid, coated onto a particulate, and the like) to a downhole location. In various embodiments, the systems can comprise a pump fluidly coupled to a tubular, the tubular containing the surface modification agent emulsions. The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the surface modification agent emulsions to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the surface modification agent emulsions to the high pressure pump. In such embodiments, the low pressure pump may "step up" the pressure of the surface modification agent emulsions before it reaches the high pressure pump.

In some embodiments, the systems described herein can further comprise a mixing tank that is upstream of the pump and in which the surface modification agent emulsion is formulated. In various embodiments, the pump (e.g., a low pressure pump, a high pressure pump, or a combination thereof) may convey the surface modification agent emulsions from the mixing tank or other source of the surface modification agent emulsions to the tubular. In other embodiments, however, the surface modification agent emulsions can be formulated offsite and transported to a worksite, in which case the surface modification agent emulsions may be introduced to the tubular via the pump directly from its shipping container (e.g., a truck, a railcar, a barge, or the like) or from a transport pipeline. In either case, the surface modification agent emulsions may be drawn into the pump, elevated to an appropriate pressure, and then introduced into the tubular for delivery downhole.

FIG. 1 shows an illustrative schematic of a system that can deliver surface modification agent emulsions of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a surface modification agent emulsion of the present disclosure may be formulated. The surface modification agent emulsions may be conveyed via line 12 to wellhead 14, where the surface modification agent emulsions enter tubular 16, tubular 16 extending from wellhead 14 into subterranean formation 18. Upon being ejected from tubular 16, the surface modification agent emulsions may subsequently penetrate into subterranean formation 18. In some instances, tubular 16 may have a plurality of orifices (not shown) through which the surface modification agent emulsions of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the surface modification agent emulsions to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the surface modification agent emulsions may, in some embodiments, flow back to wellhead 14 and exit subterranean formation 18. In some embodiments, the surface modification agent emulsion that has flowed back to wellhead 14 may subsequently be recovered and recirculated to subterranean formation 18.

It is also to be recognized that the disclosed surface modification agent emulsions may also directly or indirectly affect the various downhole equipment and tools that may come into contact with the surface modification agent emulsions during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: preparing a surface modification agent emulsion comprising an aqueous base fluid, a surfactant, and a hydrophobically-modified amine-containing polymer (HMAP), the HMAP comprising a plurality of hydrophobic modifications on an amine-containing polymer, and wherein the aqueous base fluid forms an external phase of the surface modification agent emulsion and the HMAP forms an internal phase of the surface modification agent emulsion; and introducing the surface modification agent emulsion into a subterranean formation.

B. A method comprising: preparing a surface modification agent emulsion comprising an aqueous base fluid, a surfactant, and a hydrophobically-modified amine-containing polymer (HMAP), the HMAP comprising a plurality of hydrophobic modifications on an amine-containing polymer, and wherein the aqueous base fluid forms an external phase of the surface modification agent emulsion and the HMAP forms an internal phase of the surface modification agent emulsion; coating at least a portion of a particulate with the surface modification agent emulsion, thereby forming emulsion coated particulates; and introducing the coated particulates into a subterranean formation.

C. A method comprising: preparing a surface modification agent emulsion comprising an aqueous base fluid, a surfactant, and a hydrophobically-modified amine-containing polymer (HMAP), the HMAP comprising a plurality of hydrophobic modifications on an amine-containing polymer, wherein the aqueous base fluid forms an external phase of the surface modification agent emulsion and the HMAP forms an internal phase of the surface modification agent emulsion;

preparing a treatment fluid comprising an aqueous acid solution and the surface modification agent emulsion; and introducing the treatment fluid into a subterranean formation at a rate and pressure sufficient to create or enhance at least one fracture therein, wherein the aqueous acid solution etches at least one channel in at least a portion of a face of the at least one fracture, and wherein the surface modification agent emulsion coats at least a portion of the face of the at least one fracture, thereby stabilizing loose particulates thereon and/or mitigating scale formation thereon.

Each of embodiments A, B, and C may have one or more of the following additional elements in any combination:

Element 1: Wherein the amine-containing polymer comprises at least one selected from the group consisting of a polyamine, a polyimine, a polyamide, poly(2-(N,N-dimethylamino)ethyl methacrylate), poly(2-(N,N-diethylamino) ethyl methacrylate), poly(vinyl imidazole), any copolymer thereof, and any combination thereof.

Element 2: Wherein the hydrophobic modification comprises a $C_4$-$C_{30}$ characterized by at least one selected from the group consisting of a straight chain, a branched chain, comprising an unsaturated C—C bond, comprising an aryl group, and any combination thereof.

Element 3: Wherein the HMAP is present in the surface modification agent emulsion in an amount in the range of from a lower limit of about 10% to an upper limit of about 50% by weight of the surface modification agent emulsion.

Element 4: Wherein the emulsion surfactant is selected from the group consisting of an amine surfactant, a cationic surfactant, a nonionic surfactant, an amphoteric surfactant, an anionic surfactant, and any combination thereof.

Element 5: Wherein the aqueous acid solution is selected from the group consisting of hydrochloric acid, hydrofluoric acid, acetic acid, formic acid, glycolic acid, and any combination thereof.

Element 6: Wherein the step of: introducing the coated particulates into a subterranean formation comprises forming a proppant pack in at least one fracture in the subterranean formation.

Element 7: Wherein the surface modification agent emulsion coats at least a portion of a face of the subterranean formation, thereby stabilizing loose particulates thereon and/or mitigating scale formation thereon.

Element 8: Wherein the surface modification agent emulsion is introduced into the subterranean formation at a rate and pressure sufficient to create or enhance at least one fracture therein, and wherein the surface modification agent emulsion coats at least a portion of a face of the at least one fracture, thereby stabilizing loose particulates thereon and/or mitigating scale formation thereon.

Element 9: Further comprising a wellhead with a tubular extending therefrom into the subterranean formation and a pump fluidly coupled to the tubular, wherein the step of: introducing the surface modification agent emulsion into a subterranean formation, comprises introducing the surface modification agent emulsion through the tubular.

By way of non-limiting example, exemplary combinations applicable to A, B, and C include: A with 6 and 8; A with 3, 4, and 7; B with 9; B with 1 and 6; C with 5 and 9; B with 2 and 7.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   preparing a surface modification agent emulsion comprising an aqueous base fluid, a surfactant, and a hydrophobically-modified amine-containing polymer (HMAP), the HMAP comprising a plurality of hydrophobic modifications on a poly(vinyl imidazole), and wherein the aqueous base fluid forms an external phase of the surface modification agent emulsion and the HMAP forms an internal phase of the surface modification agent emulsion; and
   introducing the surface modification agent emulsion into a subterranean formation.

2. The method of claim 1, wherein the hydrophobic modification comprises a $C_4$-$C_{30}$ characterized by at least one selected from the group consisting of a straight chain, a branched chain, comprising an unsaturated C—C bond, comprising an aryl group, and any combination thereof.

3. The method of claim 1, wherein the HMAP is present in the surface modification agent emulsion in an amount in the range of from a lower limit of about 10% to an upper limit of about 50% by weight of the surface modification agent emulsion.

4. The method of claim 1, wherein the emulsion surfactant is selected from the group consisting of an amine surfactant, a cationic surfactant, a nonionic surfactant, an amphoteric surfactant, an anionic surfactant, and any combination thereof.

5. The method of claim 1, wherein the surface modification agent emulsion coats at least a portion of a face of the subterranean formation, thereby stabilizing loose particulates thereon and/or mitigating scale formation thereon.

6. The method of claim 1, wherein the surface modification agent emulsion is introduced into the subterranean formation at a rate and pressure sufficient to create or enhance at least one fracture therein, and wherein the surface modification agent emulsion coats at least a portion of a face of the at least one fracture, thereby stabilizing loose particulates thereon and/or mitigating scale formation thereon.

7. The method of claim 1, further comprising a wellhead with a tubular extending therefrom into the subterranean formation and a pump fluidly coupled to the tubular,
   wherein the step of: introducing the surface modification agent emulsion into a subterranean formation, comprises introducing the surface modification agent emulsion through the tubular.

8. A method comprising:
preparing a surface modification agent emulsion comprising an aqueous base fluid, a surfactant, and a hydrophobically-modified amine-containing polymer (HMAP), the HMAP comprising a plurality of hydrophobic modifications on a poly(vinyl imidazole), and wherein the aqueous base fluid forms an external phase of the surface modification agent emulsion and the HMAP forms an internal phase of the surface modification agent emulsion;
coating at least a portion of a particulate with the surface modification agent emulsion, thereby forming emulsion coated particulates; and
introducing the coated particulates into a subterranean formation.

9. The method of claim 8, wherein the hydrophobic modification comprises a $C_4$-$C_{30}$ characterized by at least one selected from the group consisting of a straight chain, a branched chain, comprising an unsaturated C—C bond, comprising an aryl group, and any combination thereof.

10. The method of claim 8, wherein the HMAP is present in the surface modification agent emulsion in an amount in the range of from a lower limit of about 10% to an upper limit of about 50% by weight of the surface modification agent emulsion.

11. The method of claim 8, wherein the emulsion surfactant is selected from the group consisting of an amine surfactant, a cationic surfactant, a nonionic surfactant, an amphoteric surfactant, an anionic surfactant, and any combination thereof.

12. The method of claim 8, wherein the step of: introducing the coated particulates into a subterranean formation comprises forming a proppant pack in at least one fracture in the subterranean formation.

13. A method comprising:
preparing a surface modification agent emulsion comprising an aqueous base fluid, a surfactant, and a hydrophobically-modified amine-containing polymer (HMAP), the HMAP comprising a plurality of hydrophobic modifications on a poly(vinyl imidazole),
wherein the aqueous base fluid forms an external phase of the surface modification agent emulsion and the HMAP forms an internal phase of the surface modification agent emulsion;
preparing a treatment fluid comprising an aqueous acid solution and the surface modification agent emulsion; and
introducing the treatment fluid into a subterranean formation at a rate and pressure sufficient to create or enhance at least one fracture therein,
wherein the aqueous acid solution etches at least one channel in at least a portion of a face of the at least one fracture, and wherein the surface modification agent emulsion coats at least a portion of the face of the at least one fracture, thereby stabilizing loose particulates thereon and/or mitigating scale formation thereon.

14. The method of claim 13, wherein the hydrophobic modification comprises a $C_4$-$C_{30}$ characterized by at least one selected from the group consisting of a straight chain, a branched chain, comprising an unsaturated C—C bond, comprising an aryl group, and any combination thereof.

15. The method of claim 13, wherein the HMAP is present in the surface modification agent emulsion in an amount in the range of from a lower limit of about 10% to an upper limit of about 50% by weight of the surface modification agent emulsion.

16. The method of claim 13, wherein the emulsion surfactant is selected from the group consisting of an amine surfactant, a cationic surfactant, a nonionic surfactant, an amphoteric surfactant, an anionic surfactant, and any combination thereof.

17. The method of claim 13, wherein the aqueous acid solution is selected from the group consisting of hydrochloric acid, hydrofluoric acid, acetic acid, formic acid, glycolic acid, and any combination thereof.

* * * * *